(12) United States Patent
Egami

(10) Patent No.: US 8,036,781 B2
(45) Date of Patent: Oct. 11, 2011

(54) DRIVING OPERATION ASSISTING SYSTEM, METHOD AND VEHICLE INCORPORATING THE SYSTEM

(75) Inventor: Masahiro Egami, Yokosuka (JP)

(73) Assignee: Nissan Motor Co., Ltd., Yokohama-shi, Kanagawa-ken (JP)

(*) Notice: Subject to any disclaimer, the term of this patent is extended or adjusted under 35 U.S.C. 154(b) by 0 days.

(21) Appl. No.: 12/831,215

(22) Filed: Jul. 6, 2010

(65) Prior Publication Data

US 2010/0274438 A1    Oct. 28, 2010

Related U.S. Application Data

(62) Division of application No. 11/285,747, filed on Nov. 23, 2005.

(30) Foreign Application Priority Data

Nov. 26, 2004   (JP) .................................. 2004-341719

(51) Int. Cl.
G05D 1/00 (2006.01)
G05D 3/00 (2006.01)
G06F 17/00 (2006.01)
G06F 23/00 (2006.01)

(52) U.S. Cl. .................... 701/1; 701/9; 701/41; 701/72; 701/301

(58) Field of Classification Search .................. 701/1, 9, 701/41, 72, 301; 180/272, 274, 280
See application file for complete search history.

(56) References Cited

U.S. PATENT DOCUMENTS 5,757,949 A * 5/1998 Kinoshita et al. ............. 382/104
5,896,167 A * 4/1999 Omae et al. .................... 348/149

(Continued)

FOREIGN PATENT DOCUMENTS

JP          05-085221         4/1993

(Continued)

OTHER PUBLICATIONS

Japanese Office Action dated Mar. 17, 2009, w/English Translation.

(Continued)

*Primary Examiner* — Khoi Tran
*Assistant Examiner* — Jorge Peche
(74) *Attorney, Agent, or Firm* — McDermott Will & Emery LLP

(57) ABSTRACT

A driving assisting for calculating risk potential by considering a response delay by the driver and transmitting information related to the risk potential to the operator in a haptic manner. A controller is provided to estimate the response delay based on an operation performed by the operator. Based on the estimated response delay, the controller calculates a future position at which the risk potential is to be calculated. The longer the response delay, the remoter the future position is. The shorter the response delay, the nearer the future position is. The calculated risk potential at the future position may be transmitted to the operator via a pressing force from one of right and left side portions of a driver's seat occupied by the operator.

8 Claims, 13 Drawing Sheets

U.S. PATENT DOCUMENTS

| | | | |
|---|---|---|---|
| 6,272,418 B1 * | 8/2001 | Shinmura et al. | 701/72 |
| 6,289,281 B1 * | 9/2001 | Shinmura et al. | 701/301 |
| 2002/0184236 A1 * | 12/2002 | Donath et al. | 707/104.1 |
| 2003/0045983 A1 * | 3/2003 | Kondo et al. | 701/41 |
| 2003/0181822 A1 * | 9/2003 | Victor | 600/558 |
| 2005/0030184 A1 * | 2/2005 | Victor | 340/576 |
| 2005/0125125 A1 * | 6/2005 | Matsumoto et al. | 701/41 |
| 2006/0025893 A1 * | 2/2006 | Fischer et al. | 701/1 |

FOREIGN PATENT DOCUMENTS

| | | |
|---|---|---|
| JP | 06-197888 | 7/1994 |
| JP | 09-309358 | 12/1997 |
| JP | 2000-225877 | 8/2000 |
| JP | 2003-104147 | 4/2003 |
| JP | 2003-205760 | 7/2003 |
| JP | 2003-281698 | 10/2003 |
| JP | 2004-284484 | 10/2004 |

OTHER PUBLICATIONS

U.S. Appl. No. 11/146,081, filed Jun. 7, 2005.

* cited by examiner

A # DRIVING OPERATION ASSISTING SYSTEM, METHOD AND VEHICLE INCORPORATING THE SYSTEM

RELATED APPLICATIONS

This application is a divisional application from pending U.S. patent application Ser. No. 11/285,747, filed Nov. 23, 2005, which claims benefit of priority from Japanese Patent Application No. 2004-341719, filed Nov. 26, 2004, the disclosure of which is hereby incorporated herein by reference in it's entirety.

FIELD OF THE DISCLOSURE

The present disclosure relates to a system for assisting a driver in driving a vehicle and a vehicle incorporating the system, and more specifically, to calculating risk potential by considering a response delay by the driver and transmitting information related to the risk potential to the operator in a haptic manner

DESCRIPTION OF RELATED ART

JP2000-225877A discloses a system for transmitting information related to an obstacle to an operator of a vehicle via a vibration input from one of different portions of a driver's seat indicative of a direction in which the obstacle is approaching. It also discloses varying the vibration input with different conditions of the vehicle.

This known system is satisfactory in informing the operator the existence of an obstacle. However, the transmission of information to the operator is always allowed without regard to a driving operation performed by the operator in anticipation of new circumstance. Accordingly, a need remains for blocking unwanted transmission of information to the operator to provide an appropriate prompt to the operator to perform a driving operation in anticipation of new circumstance.

SUMMARY OF THE DISCLOSURE

This disclosure describes various methods and systems that calculate risk potential by considering a response delay by the driver, and transmits information related to the risk potential to the operator in a haptic manner.

An exemplary system comprises a detector configured to detect a driving environment around an own vehicle, and a response delay estimating device configured to estimate a response delay by an operator of the own vehicle. A risk potential calculating device is provided to calculate risk potential associated with the own vehicle at a future position based on the detected driving environment and the estimated response delay, wherein the future position is set to vary with the estimated response delay. The system includes an information transmitting device configured to transmit the calculated risk potential to the operator via a haptic input. In the system, responsive to the calculated risk potential indicating a risk to deviate to the right at the future position, the information transmitting device sets a swing angle of a right portion of a seat occupied by the operator based on the calculated risk potential, and sets a swing angle of a left portion of the seat to zero, and responsive to the calculated risk potential indicating a risk to deviate to the left at the future position, the information transmitting device sets the swing angle of the left portion of the seat based on the calculated risk potential, and sets the swing angle of the right portion of the seat to zero.

According to one embodiment, the future position is a position of the own vehicle after a period of lead time, wherein the period of the lead time is set to increase with the estimated response delay. The risk potential may be adjusted based on the estimated response delay.

According to another embodiment, the exemplary system may include an operation detecting device configured to detect an operation performed by the operator. The response delay estimating device estimates the response delay based on the detected operation. In one aspect, responsive to the detected operation exceeding a predetermined threshold, the estimated response delay is increased by a predetermined increment, and responsive to the detected operation not exceeding the predetermined threshold, the estimated response delay is decreased by a predetermined decrement. In another aspect, a standard deviation of the detected operation is calculated, and the estimated response delay is estimated based on the calculated standard deviation of the detected operation. The estimated response delay may increase as the standard deviation increases, and the estimated response delay may decrease as the standard deviation decreases.

According still another embodiment, the exemplary system includes a road shape detecting device configured to detect the shape of a road. The response delay estimating device may estimate the response delay based on the detected shape of the road. According to a further embodiment, the risk potential calculating device calculates the risk potential based on an in-lane lateral position within a lane and an azimuth angle of the own vehicle relative to the lane at the future position that is determined based on the detected response delay such that the longer the detected response delay, the remoter the future position. In one aspect, the risk potential is the sum of a first weighted value of the in-lane lateral position and a second weighted value of the azimuth angle of the own vehicle, which are individually weighted in response to the detected response delay.

According to another embodiment of this disclosure, a standard deviation of an in-lane lateral position of the own vehicle within a lane in calculated and used in estimating the response delay.

A vehicle may incorporate various exemplary systems and methods as described in this disclosure.

An exemplary method for assisting an operator in operating an own vehicle includes the steps of detecting a driving environment around the own vehicle, and estimating a response delay by the operator. Risk potential associated with the own vehicle at a future position after a period of lead time is calculated based on the detected driving environment and the estimated response delay. The period of lead time is set to increase with the estimated response delay. In one aspect, the exemplary method further includes the step of transmitting the calculated risk potential to the operator via a haptic input.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

DETAILED DESCRIPTION OF ILLUSTRATIVE EMBODIMENTS

Various exemplary embodiments according to the present disclosure are described hereunder in detail with suitable reference to the accompanying drawings.

First Exemplary Embodiment

Referring to FIGS. 1 to 10 of the accompanying drawings, the following sections provide descriptions of a first illustrative embodiment of a system and method for assisting driving operation of an operator of a vehicle.

Figure 1:
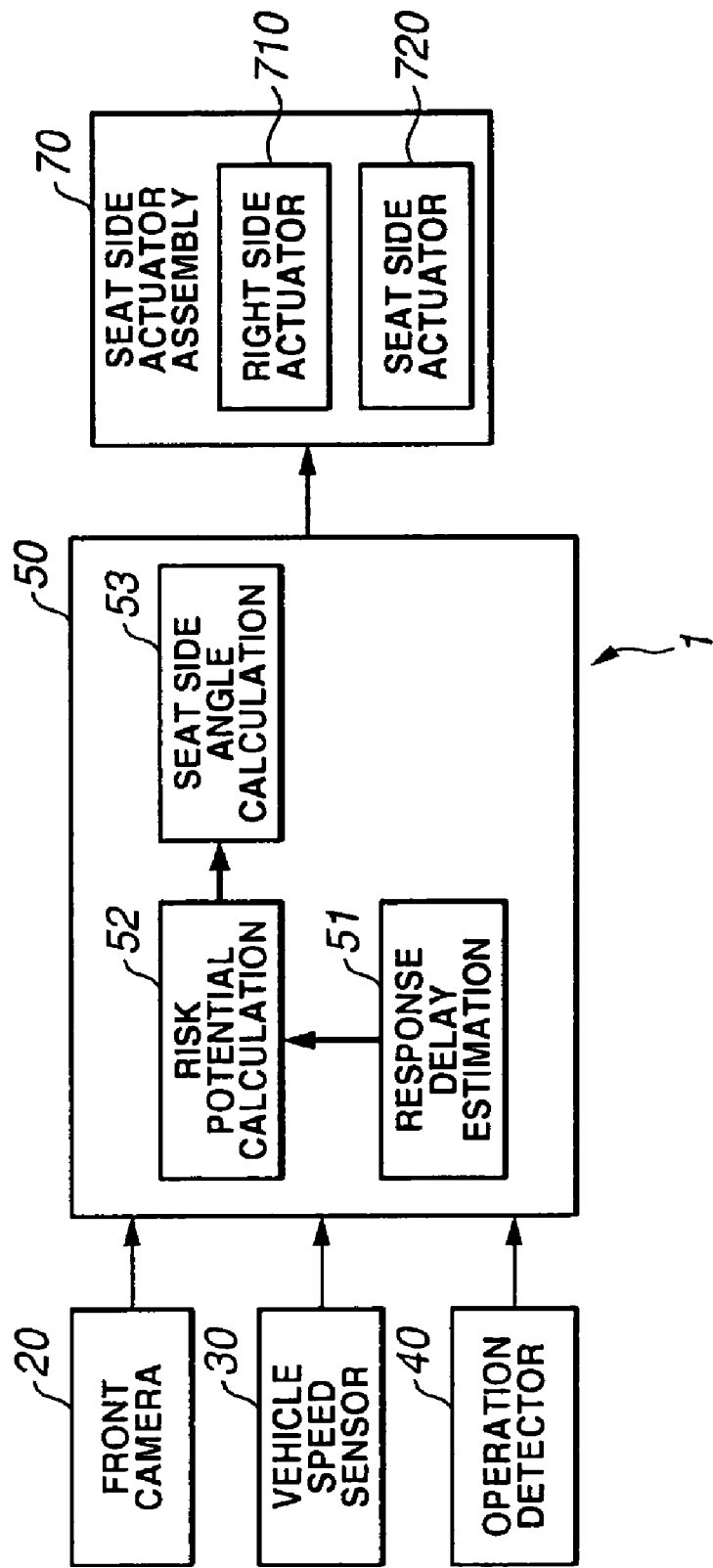
FIG. 1 is a block diagram illustrating a first exemplary embodiment of a system and a method for assisting an operator in operating a vehicle.
Figure 2:
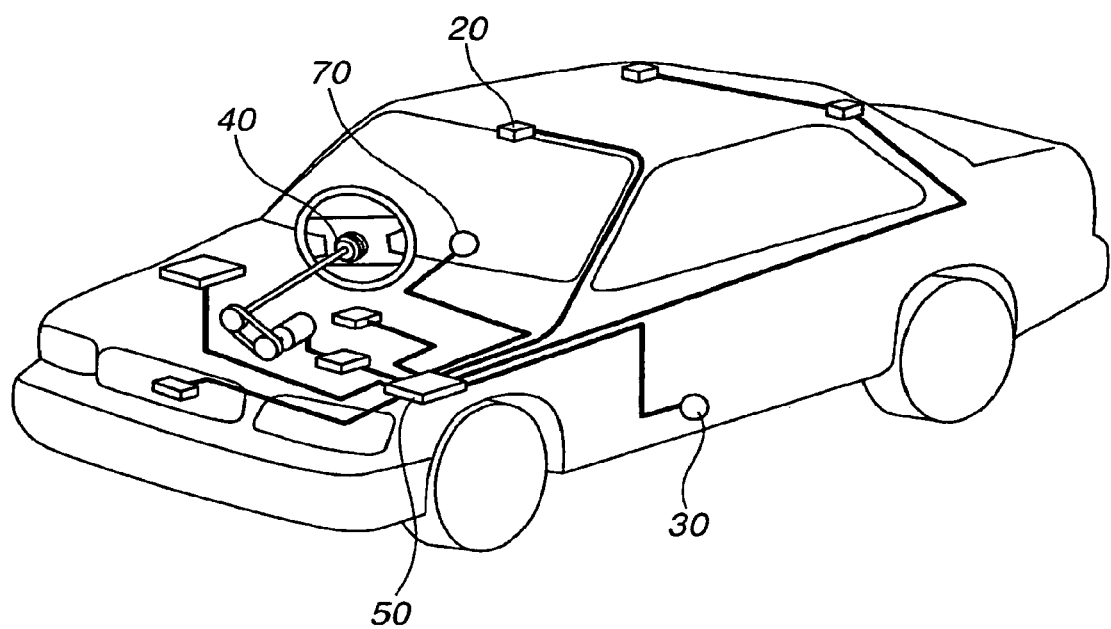
FIG. 2 is a perspective view of a vehicle incorporating the driving operation assisting system as shown in FIG. 1.

In FIG. 1, the reference numeral 1 designates a system for assisting an operator in operating a vehicle, i.e., an own vehicle shown in FIG. 2. The driving operation assisting system 1 includes a front camera 20, a vehicle speed sensor 30, an operation detector 40, a controller 50, and a seat side actuator assembly 70.

The front camera 20 is of the CCD type or CMOS type. The front camera 10 may be mounted to the vehicle in the vicinity of an internal rear view mirror to pick up an image of a road ahead of the own vehicle. The front camera 20 provides the image to the controller 50. The region covered by the front camera 20 extends from the camera axis to each side by 30 degrees. The road scenes within this region are stored as images.

The vehicle speed sensor 30 detects a vehicle speed of the own vehicle by measuring a revolution speed of a wheel or an output member of a transmission, and provides the detected vehicle speed to the controller 50.

The operation detector 40 is in the form of a steering angle sensor attached to the steering system of the own vehicle. In the embodiment, the operation detector 40 detects a steering angle θ through which the operator manipulated a steering wheel. The detected steering angle θ is provided to the controller 50 and used as an amount of operation by the operator.

The controller 50 may be composed of, as usual, a central processing unit (CPU), a read only memory (ROM), a random access memory (RAM), and CPU peripheral devices. In the exemplary embodiment, the controller 50 includes, in software implementation, a response delay estimation block 51, a risk potential calculation device 52, and a seat side angle calculation device 53.

The response delay estimation block 51 estimates a response by the operator from the time that the operator recognizes a need to perform a specific operation to the time that the operation is actually performed by the operator. The operation may be a steering angle θ detected by the steering angle sensor 40. The risk potential calculation device 52 calculates a risk potential RP associated with the own vehicle based on a running state of the own vehicle obtained via the front camera 20 and vehicle speed sensor 30, and the response delay estimated by the response delay estimation block 51.

The seat side angle calculation device 53 calculates rotary angles through which right and left sides of driver's seat swing based on the risk potential RP calculated at the risk potential calculation device 52. The controller 50 transmits the risk potential RP to the operator via a pressing force input from the driver's seat.

Figure 3:
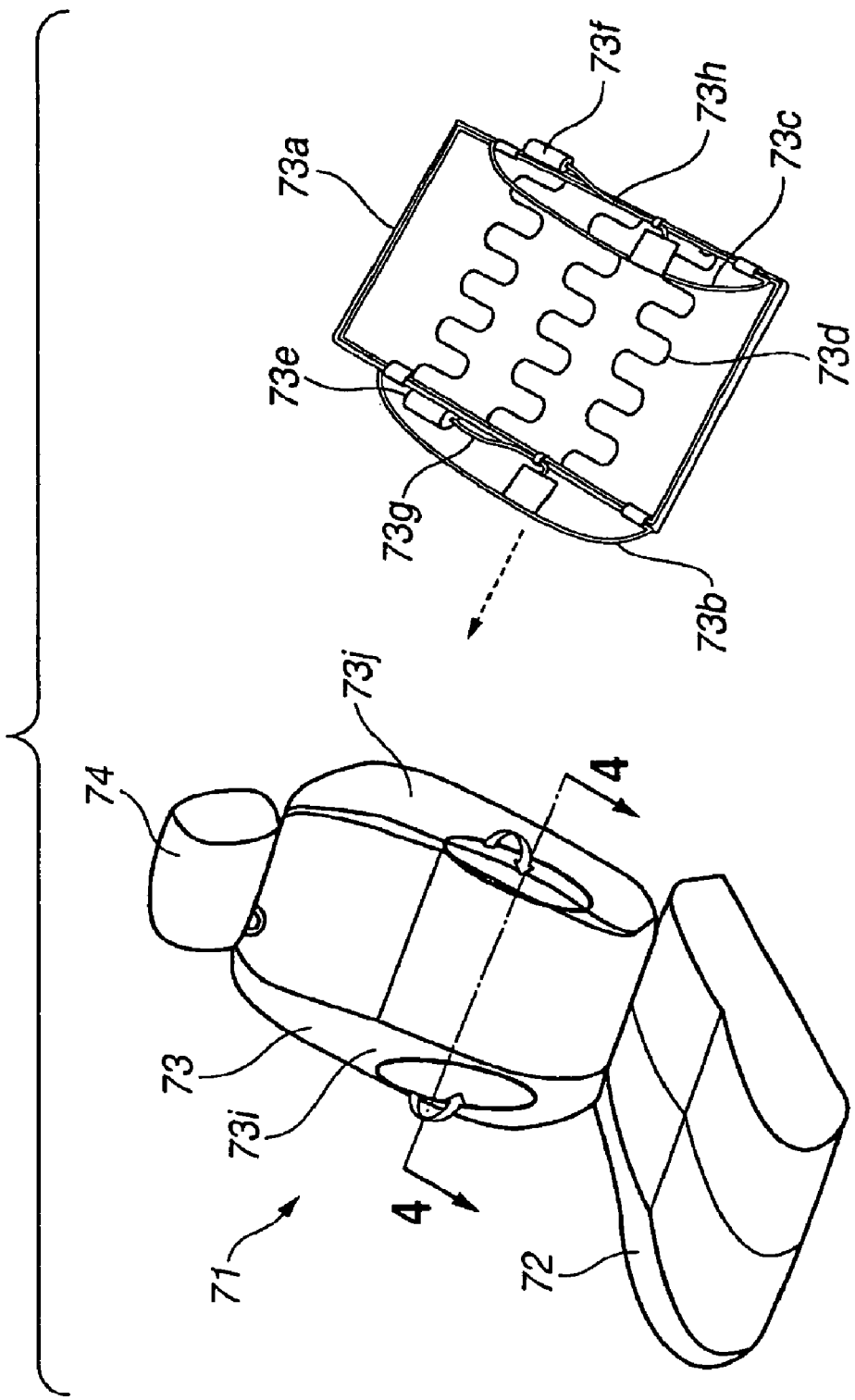
FIG. 3 is an exploded view of a driver's seat mounted to the vehicle shown in FIG. 2 with a seat actuator removed.
Figure 4:
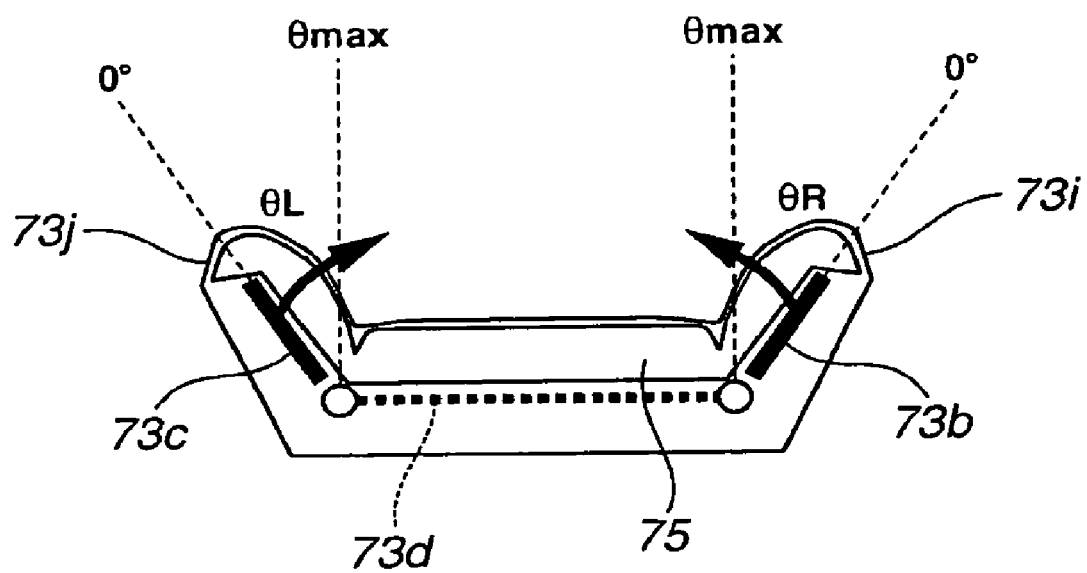
FIG. 4 is a cross sectional view taken through the line 4-4 in FIG. 3.

The seat side actuator assembly 70 is provided with a right side actuator 710 and a left side actuator 720. In response to a control signal generated by the controller 50, the right side and left side actuators 710 and 720 modifies the contour of the seat 71 to transmit the risk potential RP to the operator via the pressing force input from the driver's seat. FIG. 3 illustrates the driver's seat 71 mounted to the vehicle installed with the driving operation assisting system I and having its seat contour varied by the seat side actuator assembly 70. FIG. 4 is a cross section taken through the line 4-4 in FIG. 3.

As shown in FIGS. 3 and 4, the driver's seat 71 includes a cushion 72, a seat back 73 and a head rest 74. In the first exemplary embodiment, the right side actuator 710 and left side actuator 720 of the seat side actuator assembly 70 swing the right and left side portions of the seat back 73 thereby applying a pressing force to the operator.

The seat back 73 is provided with a seat back frame 73a and right and left side frames 73b and 73c. These frames 73a, 73b and 73c are covered by a urethane pad 75 (see FIG. 4). To support this urethane pad 75, the seat back frame 73a has springs 73d attached thereto.

The right side and left side actuators 710 and 720 include motor units 73e and 73f, respectively, for swinging the right and left sub-frames 73b and 73c. Torques generated by the motor units 73e and 73f attached to the seat back 73 are transmitted via torque cables 73g and 73h to the sub-frames 73b and 73c, respectively, thereby swinging the right and left sub-frames 73b and 73c about the right and left side edges of the seat back frame 73a, respectively. As shown in FIG. 4, the right and left sub-frames 73b and 73c can turn from the illustrated position where the seat contour remains unmodified to positions generally orthogonal to the seat back frame 73a.

In response to the control signal generated by the controller 50, the seat side actuator assembly 70 regulates the motor units 73e and 73f thereby swinging the right and left side portions 73i and 73j, respectively. The right and left side portions 73i and 73f swing into pressing engagement with the operator or swing out of engagement with the operator thereby transmitting the risk potential RP around the own vehicle to the operator via an input pressing one of the operator's sides.

Figure 5:
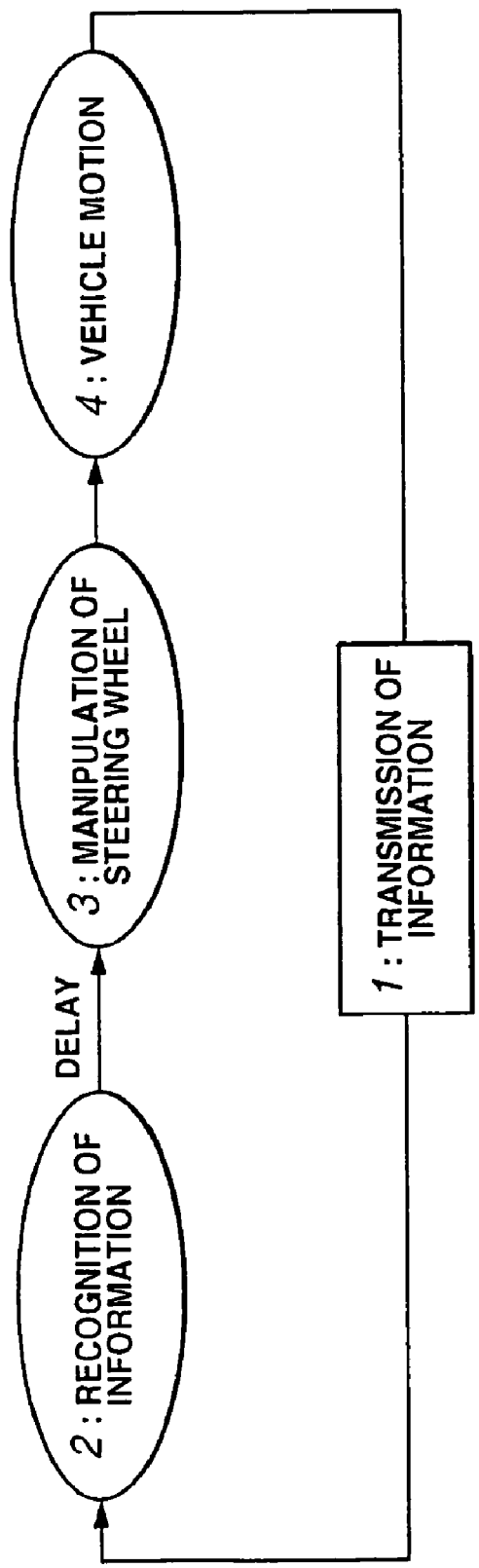
FIG. 5 is a diagram illustrating a cycle of transmission of information in the exemplary embodiment.

The driving operation assisting system 1 transmits the information related to risk potential via a haptic input as shown in FIG. 5. A cycle as shown in FIG. 5 includes 1: Transmission of information from the seat 71 (Information offer); 2: Recognition of the information transmitted; 3: Manipulation of steering wheel in response to the recognized information; and 4: Vehicle motion in response to the manipulation of the steering wheel.

In the cycle of FIG. 5, there is a delay from the recognition of information to the manipulation of steering wheel. This delay becomes noticeable when the information is transmitted via a device that is different from driving operation equipment for controlling the driving of the vehicle by the operator.

This delay from the recognition of information to the manipulation of steering wheel differs between individuals and may vary with different states of the operator. If, for example, the operator is actively engaging in the driving operation, the delay is short because the operator will engage in appropriate driving operation immediately after recognition of information. On the other hand, if the operative is only passively engaging in the driving operation, the delay is long because the operator tends to maintain the current driving operation even after recognition of information.

Transmitting information to the operator without any regard to this variation in the time delay makes it difficult for the operator to perceive the transmitted information as a good prompt to perform an appropriate driving operation when the delay is long, and it increases possibility that the operator may regard the transmitted information as a nuisance to an intended driving operation when the delay is short. In order to address the time delay, the exemplary embodiment calculates risk potential RP, as future risk potential, based on the operator's response delay to realize such transmission of information to the operator as to provide a prompt to the operator to perform an appropriate driving operation.

Figure 6:
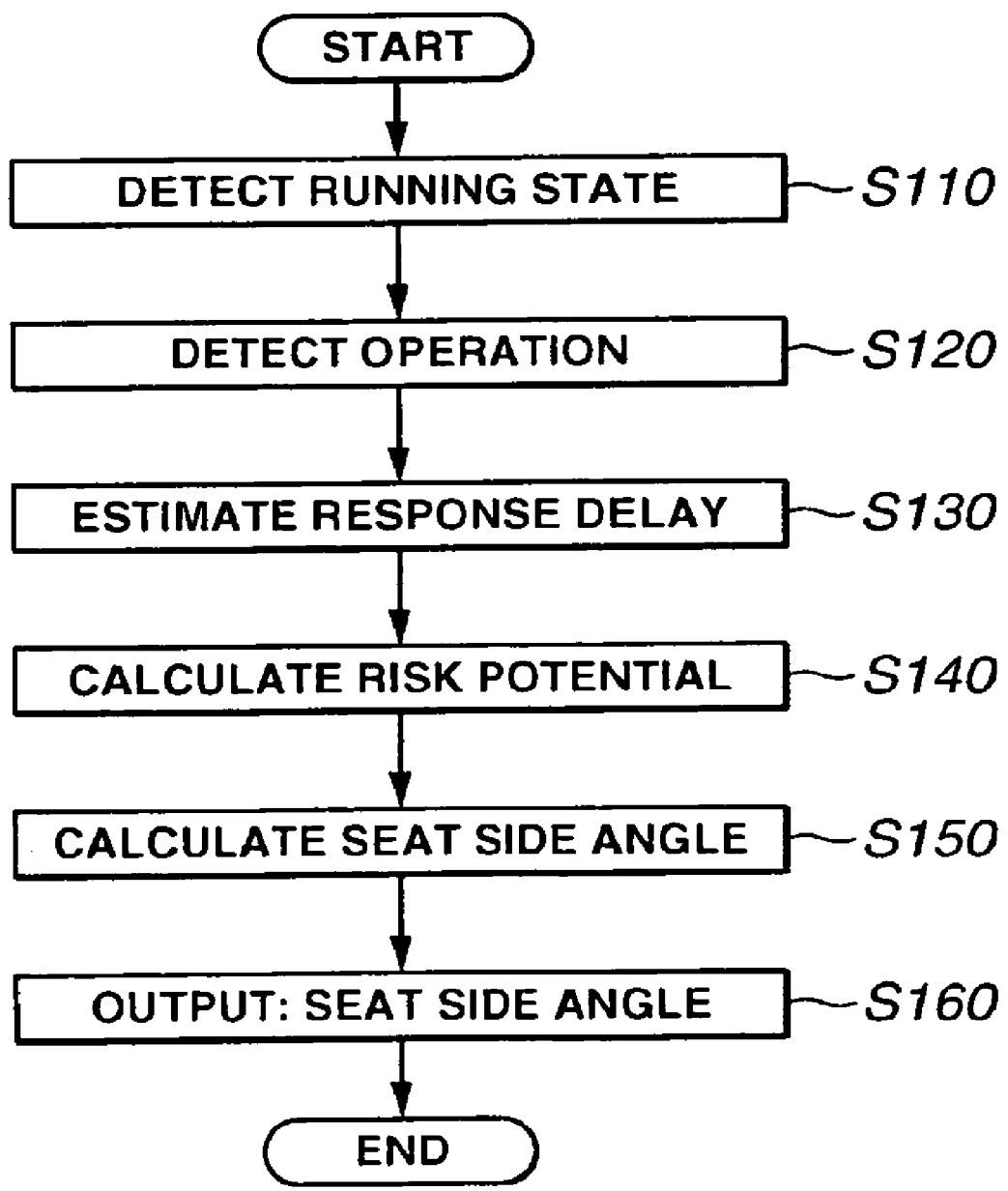
FIG. 6 is a flow chart illustrating a main routine of a control program in the exemplary embodiment.

The flow chart in FIG. 6 illustrates steps of a main control routine of a driving operation assisting program according to the exemplary embodiment. This program is executed by the controller 50. Execution of the program is repeated at a regular interval of 50 milliseconds.

At step S110, the controller 50 detects a running state of the own vehicle based on results of detection at the front camera 20 and the vehicle speed sensor 30. Particularly, the controller 50 recognizes lane markers defining a lane which the own vehicle is traveling on after processing image signals from the front camera 20 covering the front region extending from the own vehicle to detect an in-lane lateral position of the own vehicle at the present moment, an angle of the own vehicle relative to the lane at the present moment and a shape of the road at the present moment. The controller 50 also detects a vehicle speed V of the own vehicle.

At step S120, the controller 50 reads in an operation amount, such as a steering angle θ, by the operator detected by the operation detector 40. At step S130, the controller 50 estimates a response delay by the operator. Particularly, the controller 50 calculates an index S indicative of a response delay by the operator. The response delay index S is a physical quantity that increases as the response delay increases. Referring to the flow chart illustrated in FIG. 7, processing performed at this step S130 is further described.

Figure 7:
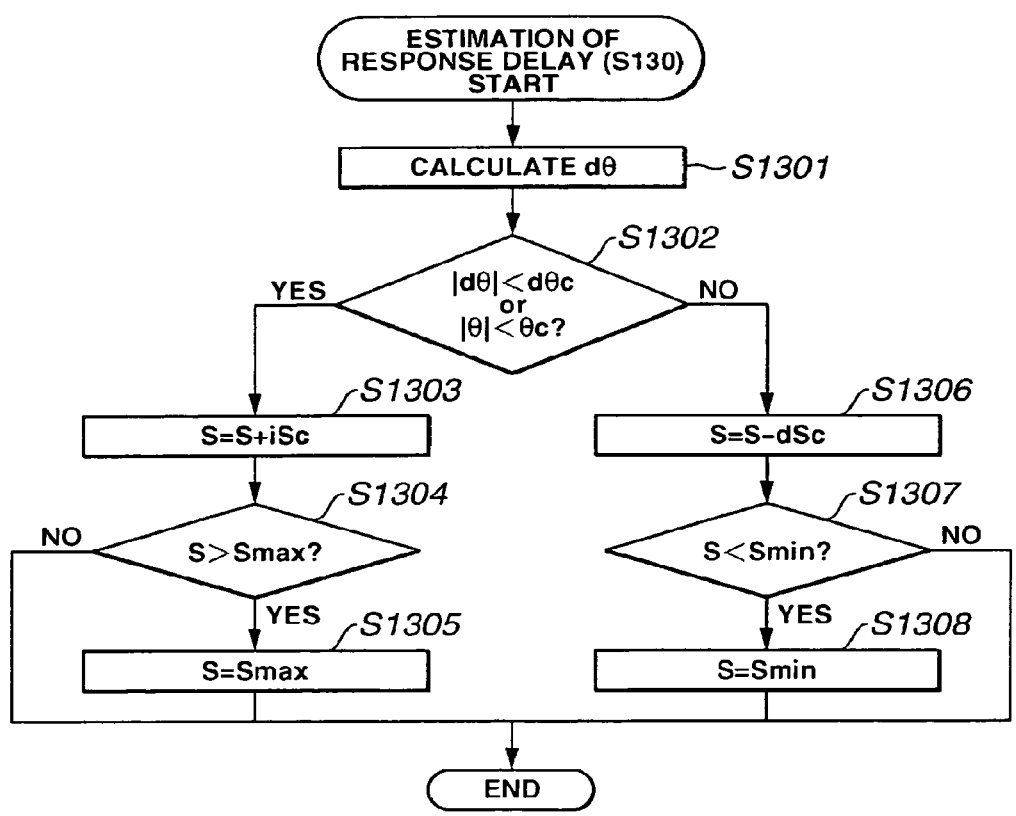
FIG. 7 is a flow chart of a sub-routine in the exemplary embodiment.

In FIG. 7, at step S1301, the controller 50 calculates a steering angle rate (speed) dθ from the steering angle θ. The steering angle θ and steering angle rate dθ take positive values when the steering wheel is being turned to the right. At step S1302, the controller 50 compares the steering angle rate dθ, calculated at step S1301, and the steering angle θ to predetermined values dθc and θc, respectively. If, at step S1302, the absolute value of the steering angle rate |dθ| is less than the predetermined value dθc or the absolute value of the steering angle |dθ| is less than the predetermined value θc, the sub-routine proceeds to step S1303.

As the variation in the steering angle is small or the amount of the steering angle is small, the controller 50 judges that the operator is in a passive state and maintaining the current state so that the response delay is increasing. Thus, at step S1303, the controller 50 increases the index S by adding a predetermined value iSc to the last value of the index S by calculating the following equation:

$$S = S + iSc \quad \text{(Eq. 1)}$$

where: the predetermined value iSc is an appropriate value representing an increment.

At step S1304, the controller 50 judges whether or not the index S is greater than the maximum value Smax. If the index S exceeds than the maximum value Smax (S>Smax), the sub-routine proceeds to step S1305 where the controller 50 sets the maximum value Smax as the index S. If the index S is less than or equal to Smax, the sub-routine comes to an end and the index S obtained at step S1303 is used unaltered.

If, at step S1302, the interrogation results in negative, the sub-routine proceeds to step S1306. As the variation in the steering angle is large and the amount of the steering angle is large, the controller 50 judges that the operator is positively manipulating the steering wheel. Thus, at step S1306, the controller 50 reduces the index S by subtracting a predetermined value dSc from the last value of the index S by calculating the following equation:

$$S = S - dSC \quad \text{(Eq. 2)}$$

where: the predetermined value dSc is an appropriate value representing a decrement.

At step S1307, the controller 50 judges whether or not the index S is less than the minimum value Smin. If the index S is less than the minimum value Smin, the sub-routine proceeds to step S1308 where the controller 50 sets the minimum value Smin as the index S. If the index S is greater than or equal to the minimum value Smin, the sub-routine comes to an end and the index S obtained at step S1303 is used unaltered.

Figure 8A:
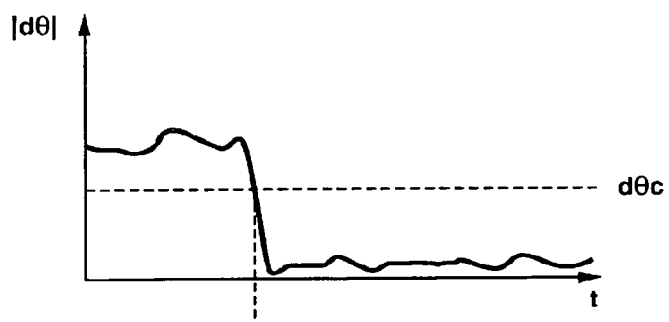
FIG. 8(a) illustrates values of steering angle rate relative to time in the exemplary embodiment.
Figure 8B:
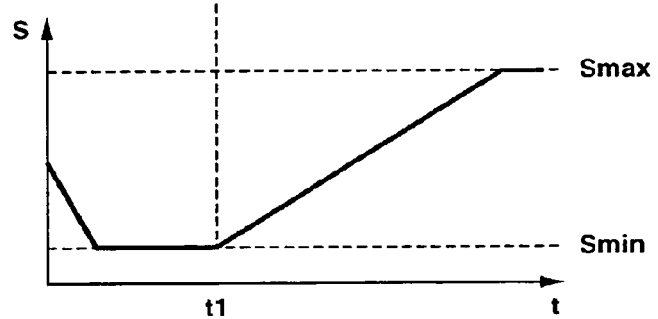
FIG. 8(b) illustrates values of response delay index S relative to time in the exemplary embodiment.

FIGS. 8(a) and 8(b) illustrate an example of the relationship between values steering angle rate |dθ| relative to time and varying of index S with time. In this example, the steering angle rate |dθ| only is used to determine whether the index S is to be increased or decreased. As shown in FIGS. 8(a) and 8(b), the steering angle rate |dθ| stays greater than the predetermined value dθc till the moment t1, causing the index S to drop gradually to the minimum value Smin. This is because the controller 50 judges that the response delay is short. Immediately after the moment t1, the steering angle rate |dθ| falls below the predetermined value dθc and stays lower than the predetermined value dθc, causing the index S to increase gradually toward the maximum value Smax. This is because the controller judges that the response delay is long.

After calculating the response delay index S at step S130, the control routine proceeds to step S140 (see FIG. 6).

At step S140, the controller 50 calculates risk potential RP associated with the own vehicle based on the running state detected at step S110 and the response delay index S calculated at step S130. This risk potential RP is regarded as risk associated with a future state of the own vehicle. That is, at step S140, the controller 50 calculates a risk that the own vehicle might deviate from the lane at a future position of the own vehicle. The processing at this step S140 is described using the flow chart illustrated in FIG. 9.

Figure 9:
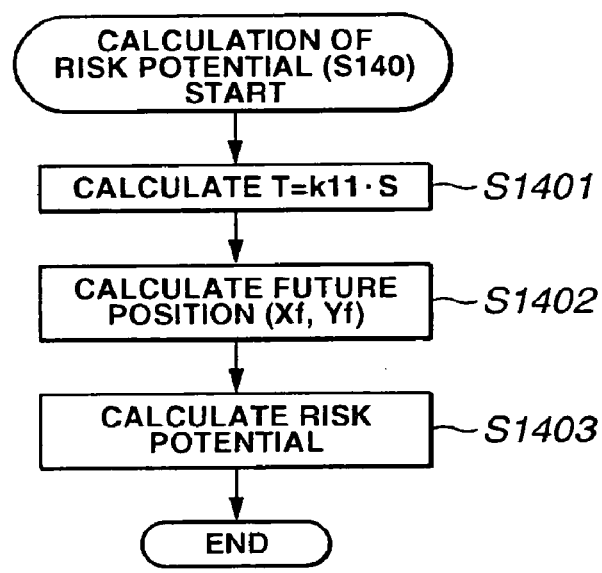
FIG. 9 is a flow chart of a sub-routine in the exemplary embodiment.

In FIG. 9, at step S1401, the controller 50 calculates a lead time T for setting a future position of the own vehicle using the response delay index S calculated at step S130. The lead time T may be expressed as:

$$T = k11 \cdot S \quad \text{(Eq. 3)}$$

where: k11 is the coefficient.

At step S1402, the controller 50 calculates a future position, which the own vehicle will reach, after the elapse of the lead time T (sec) calculated at step S1401. First, the controller 50 calculates a radius of turning circle R based on the current own vehicle speed V and steering angle θ. The radius of turning circle R may be expressed as the reciprocal of a turning curvature ρ (1/m), that is, R=1/ρ. The turning curvature ρ may be expressed as:

$$\rho = 1/\{L(1 + A \cdot V^2)\} \times \theta/N \quad \text{(Eq. 4)}$$

where: L is the wheel base of the own vehicle, A is the stability factor (positive constant) determined according to the own vehicle, and N is the steering gear ratio.

Figure 10:
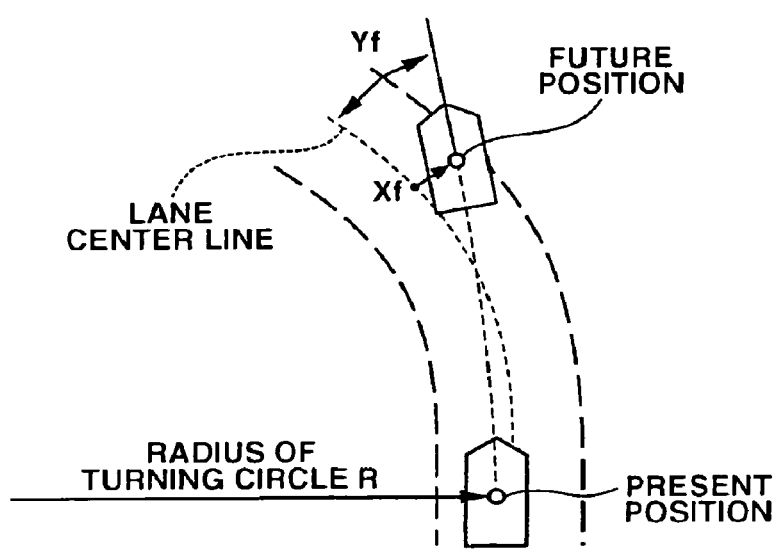
FIG. 10 is a diagram illustrating a future position of the own vehicle with respect to the present position in the exemplary embodiment.

Referring to FIG. 10, the controller 50 calculates, as a future position, a position which the own vehicle will, reach upon elapse of the lead time T (sec) if the own vehicle travels along a path defined by the radius of the turning circle R at the own vehicle speed V. The longer the response delay, the remoter the future position is. The shorter the response delay, the nearer the future position is. The controller 50 calculates the future position in terms of an in-lane lateral position Xf and an azimuth angle Yf. The in-lane lateral position Xf is a distance of the center of the own vehicle at the future position from the lane centerline. The azimuth angle Yf is an angle between the longitudinal line of the own vehicle at the future position and the lane centerline. The azimuth angle Yf takes a positive value if the own vehicle is in the illustrated future position in FIG. 10 and the longitudinal line of the own vehicle is on the right side of the lane centerline.

At step S1403, the controller 50 calculates risk potential RP around the own vehicle at the future position using the in-lane lateral position Xf and the azimuth angle Yf of the own vehicle at the future position calculated at step S1402. The risk potential RP to be calculated may be expressed as:

$$RP = k12 \cdot Xf + k13 \cdot Yf \quad \text{(Eq. 5)}$$

where: k12 and k13 are the coefficients appropriately determined.

Referring back to FIG. 6, after calculating the risk potential RP at step S140, the main routine proceeds to step S150.

At step S150, the controller 50 calculates seat side angles of the right and left side portions 73i and 73j of the driver's seat 71 based on the risk potential RP calculated at step S140. In the exemplary embodiment, the controller 50 calculates a swing angle θR of the right side portion 73i and a swing angle θL of the left side portion 73j. Referring to FIG. 4, the swing angles θR and θL take an initial value 0 (zero) when the right and left side portions 73i and 73j take the most outward positions, the remotest positions from the operator occupying the driver's seat 71. Increasing the swing angles θR and θL cause the right and left sub-frames 73b and 73c to swing inwardly toward the operator occupying the driver's seat 71. The swing angles θR and θL take the maximum value θmax when the right and left sub-frames 73b and 73c take orthogonal positions to the seat back frame 73a.

If the risk potential RP is greater than 0 (zero) and the future position of the own vehicle indicates that the vehicle may deviate to the right from the lane (see FIG. 10), the controller 50 calculates the swing angles θR and θL which are expressed as:

$$\theta R = k14 \cdot RP$$

$$\theta L = 0 \quad \text{(Eq. 6)}$$

If the risk potential RP is less than 0 (zero) and the future position of the own vehicle indicates that the vehicle may deviate to the left from the lane, the controller 50 calculates the swing angles θR and θL which are expressed as:

$$\theta R = 0$$

$$\theta L = k14 \cdot |RP| \quad \text{(Eq. 7)}$$

At step S160, the controller 50 provides motor rotary angles to the seat side actuator assembly 70 to cause the right and left sub-frames 73b and 73c to assume the swing angles θR and θL calculated at step S150. Based on the control signals, the seat side actuator assembly 70 regulates drive of the motor unit 73e of the right side portion 73i and drive of the motor unit 73f of the left side portion 73j. After step S160, the main routine comes to an end.

The following sections provide description of the operation of the exemplary embodiment of the driving operation assisting system 1.

The controller 50 calculates risk potential RP indicative of risk that the own vehicle may deviate from the lane at the future position, and transmits the calculated risk potential RP via a pressing force from the seat 71. If, as illustrated in FIG. 10, there is risk that the own vehicle may deviate to the right from the lane in the future position, the pressing force is applied to the operator from the right side portion 73i. If there is risk that the own vehicle may deviate to the left from the lane, the pressing force is applied to the operator from the left side portion 73i. The magnitude of the risk that the own vehicle may deviate from the lane is transmitted to the operator by increasing the magnitude of the pressing force applied to the operator.

The response delay index S determines the future position of the own vehicle. The longer the response delay, the remoter the future position is. The shorter the response delay, the nearer the future position is. Accordingly, responsive to a longer response delay, the risk potential RP at a remoter future position is calculated. Further, responsive to a shorter response delay, the risk potential RP at the nearer future position is calculated.

In response to a longer response delay, the risk potential RP at the remoter future position is transmitted to the operator thereby providing a prompt to the operator to perform a driving operation appropriate for the circumstance at the future position. In response to a shorter response delay, the risk potential RP at the nearer position is transmitted to the operator thereby enhancing accuracy with which the operator recognizes the present circumstance.

The first exemplary embodiment provides the following effects:

(1) Based on the running state of the own vehicle and the response delay of the operator, the controller 50 calculates the risk potential RP at the remoter future position as the response delay is the longer. It transmits the calculated risk potential RP to the operator via a haptic input. Referring to the illustrated cycle in FIG. 5, the longer the response delay, the longer it takes for the operator to engage in a driving operation after recognition of information. Accordingly, the longer is the response delay, the risk potential RP at the remoter future is transmitted to the operator thereby providing a prompt to the operator to perform a driving operation appropriate to the future circumstance. The shorter is the response delay, the risk potential RP at the nearer future is transmitted to the operator thereby enhancing accuracy with which the operator recognize the present circumstance.

(2) As the haptic input, a pressing force is generated from a right or a left side region of the seat (driver's seat) 71. More particularly, the pressing force is generated in response to the risk potential RP from the right side portion 73i or the left side portion 73j. The transmission of information is ensured because the seat 71, with which the operator is always in contact over substantially wide contact area, is used. The direction in which the risk is approaching is clearly transmitted to the operator via the pressing force applied to the operator from the region of the seat 71 indicative of the direction.

(3) The response delay estimation block 51 estimates the response delay of the operator based on the operation by the operator. More particularly, the steering angle $\theta$ is detected, and the response delay index S is calculated based on a manipulation pattern of the steering wheel by the operator. For example, if the steering angle rate (speed) $|d\theta|$ is great and the steering angle $\theta$ is great, it is concluded that the response delay by the operator is short because the operator is quick in performing driving operation, and the response delay index S is made small. The response delay by the operator can be estimated with good accuracy.

(4) The risk potential calculation device 52 calculates the risk potential RP based on the in-lane lateral position Xf and the azimuth angle Yf of the own vehicle relative to the lane at the future position that is set remoter as the response delay becomes longer. The calculated risk potential RP is indicative of risk that the vehicle may deviate from the lane at the future position. The longer the response delay, the remoter the future position is. This setting of the future position makes it possible to transmit information to the operator taking into account the response delay by the operator thereby providing a prompt to the operator to perform a driving operation appropriate to the future circumstance.

Second Exemplary Embodiment

The second exemplary embodiment is substantially the same as the first exemplary embodiment represented by FIGS. 1 and 2. However, the second exemplary embodiment is different from the first exemplary embodiment in the manner of calculating a response delay index S.

In the second exemplary embodiment, the response delay index S is calculated based on a standard deviation of the steering angle rate (speed) $d\theta$. In the second exemplary embodiment, it is considered that the response delay by the operator is short when the standard deviation of the steering angle rate (speed) $d\theta$ is low and the operator steering operation is smooth. However, it is considered that the response delay is long when the standard deviation of the steering angle rate (speed) is high and the operator steering operation is rough.

More particularly, the standard deviation $\sigma$ of old values of the steering angle rate (speed) $d\theta$ collected over a predetermined period of time T1 (sec) from the present moment backward to a past moment is calculated. Using the standard deviation $\sigma$ and a coefficient k21, the response delay index S may be expressed as:

$$S = k21 \cdot \sigma \quad \text{(Eq. 8)}$$

Similar to the first exemplary embodiment, the relationship Smin≦S≦Smax holds. The larger the response delay S index expressed by the equation (Eq. 8), the longer the response delay.

The manner of calculating a risk potential Rp and the manner of calculating seat side wind angles $\theta R$ and $\theta L$ are comparable to those used in the first exemplary embodiment.

The same effects provided by the first exemplary embodiment may be provided by calculating the response delay index S using the standard deviation $\sigma$.

Third Exemplary Embodiment

The third exemplary embodiment is substantially the same as the first exemplary embodiment represented by FIGS. 1 and 2. However, the third exemplary embodiment is different from the first exemplary embodiment in that risk potential RP at a future position is calculated based on a response delay index S.

In the third exemplary embodiment, the risk potential RP at the future position is adjusted based on the response delay index S. The risk potential RP may be expressed as:

$$RP = k31 \cdot Xf + k32 \cdot Yf \quad \text{(Eq. 9)}$$

Figure 11:
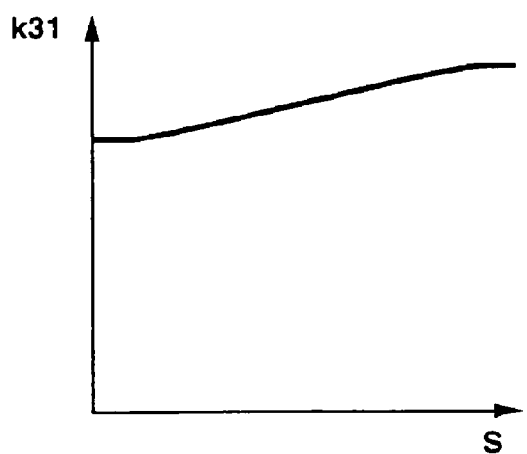
FIG. 11 illustrates values of a coefficient k31 relative to different value of response delay index S in a third exemplary embodiment.
Figure 12:
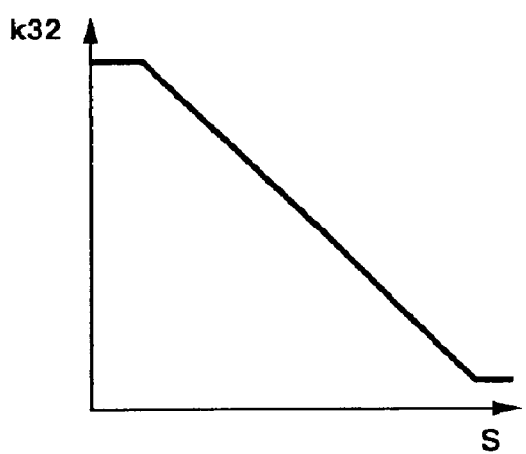
FIG. 12 illustrates values of a coefficient k32 relative to different values of response delay index S in the exemplary embodiment.

Weighting coefficients k31 and k32 are set in accordance with the response delay index S. FIGS. 11 and 12 illustrate the relationship between the coefficient k31 and the response delay index S and the relationship between the coefficient k32 and the response delay index S, respectively. As illustrated in FIG. 11, the coefficient k31 increases gradually as the response delay index S increases and the response delay index S increases. As illustrated in FIG. 12, the coefficient k32 reduces gradually as the response delay index S increases.

As the response delay index S increases indicating that the response delay by the operator increases, the in-lane lateral position Xf is heavily weighted, while the azimuth angle Yf is less weighted. Thus, transmission of risk associated with the in-lane lateral position Xf to the operator comes before the transmission of risk associated with the azimuth angle Yf when the response delay by the operator is long. This provides a prompt to the operator to perform a driving operation to avoid deviation of the vehicle from the lane.

In this manner, calculating the risk potential RP using the response delay dependent coefficients k31 and k32 provides adequate transmission of information to the operator and prompts the operator to an appropriate driving operation.

Fourth Exemplary Embodiment

The fourth exemplary embodiment is substantially the same as the first exemplary embodiment represented by FIGS. 1 and 2. However, the fourth exemplary embodiment is different from the first exemplary embodiment in the manner of calculating a response delay index S.

In the fourth exemplary embodiment, the response delay index S is calculated based on the shape of a road, which the own vehicle travels on. More particularly, the road shape is detected out of a front image in front of the own vehicle picked up by a front camera 20 to give a road curvature C of the road. Collecting detected values of the road curvature C of the road which the own vehicle had traveled over a predetermined period of time ending with the present moment to give the absolute values of them. The average value Cm of these absolute values is calculated. This average value Cm is called the road curvature average value. The response delay index S is calculated based on the curvature average value Cm using the illustrated map in FIG. 13.

Figure 13:
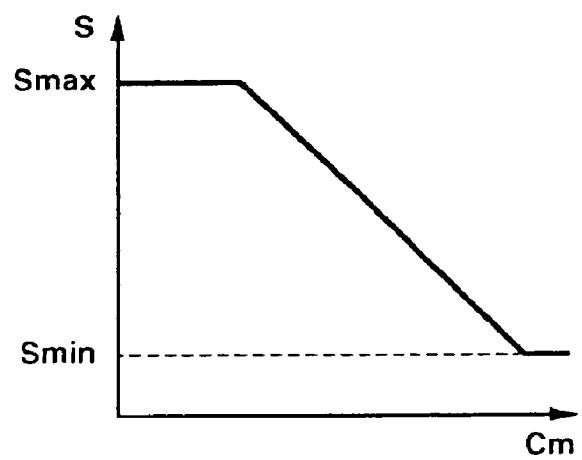
FIG. 13 illustrates values of response delay index S relative to different values of road curvature average Cm in a fourth exemplary embodiment.

As shown in FIG. 13, the response delay index S reduces as the road curvature average value Cm increases. It is judged that the response delay by the operator is short due to a need for concentration on driving operation if the curvature of a road, which the operator has driven through, is sharp. Similar to the first exemplary embodiment, the relation Smin≦S≦Smax holds.

The road curvature C may be calculated from data on a road obtained by a navigation system. The manner of calculating the risk potential RP and the manner of calculating the seat side swing angles θR and θL correspond exactly to those used in the first exemplary embodiment.

Employing the shape of a road, which the operator has driven the vehicle along, to estimate the response delay by the operator has proven to be effective in enhancing accuracy with which the response is estimated because it has reflected the operator's tendency to concentrate on driving operation during driving through a road having curves continuously.

Fifth Exemplary Embodiment

The fifth exemplary embodiment is substantially the same as the first exemplary embodiment represented by FIGS. 1 and 2. However, the fifth exemplary embodiment is different from the first exemplary embodiment in the manner of calculating a response delay index S.

In the fifth exemplary embodiment, the in-lane lateral position of the own vehicle is used to calculate the response delay index S. More particularly, the standard deviation σX of old values of the in-lane lateral position collected over a predetermined period of time T2 (sec) from the present moment backward to a past moment is calculated. It is judged that the response delay is long when the standard deviation σX is large and the deflection of the own vehicle is large. It is judged that the response delay is short when the standard deviation σX is small and the deflection of the own vehicle is small.

Using the standard deviation σX and a coefficient k51, the response delay index S may be expressed as:

$$S = k51 \cdot \sigma X \quad \text{(Eq. 10)}$$

Similar to the first exemplary embodiment, the relationship Smin≦S≦Smax holds. The larger the response delay index S expressed by the equation (Eq. 10), the longer the response delay.

The manner of calculating a risk potential Rp and the manner of calculating seat side wind angles θR and θL exactly correspond to those used in the first exemplary embodiment.

The same effects provided by the first exemplary embodiment may be provided by calculating the response delay index S using the standard deviation σX.

Sixth Exemplary Embodiment

Figure 14:
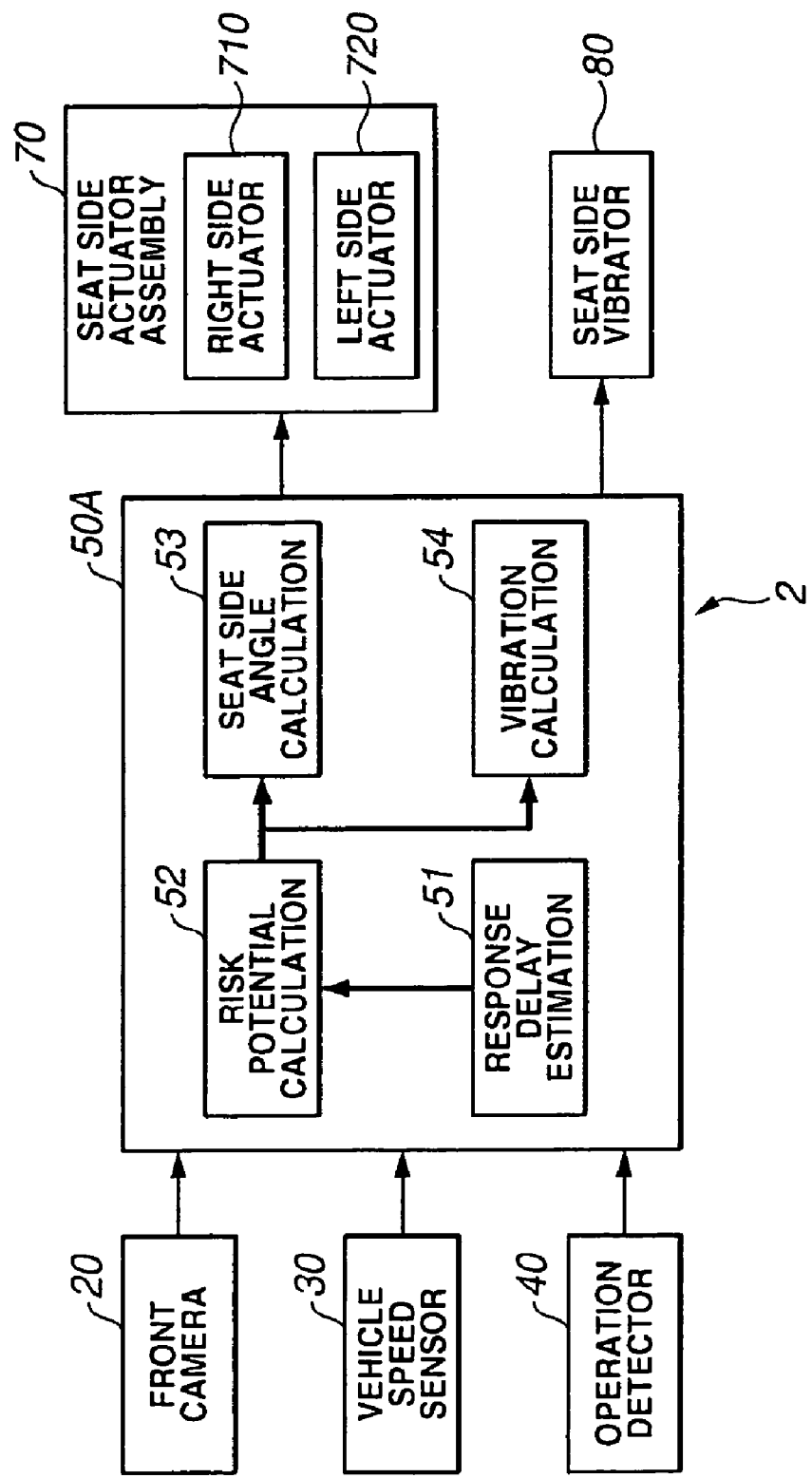
FIG. 14 is a block diagram illustrating the sixth exemplary embodiment according to the present disclosure.

Referring to FIGS. 14 to 17, the sixth exemplary embodiment is described. FIG. 14 is a block diagram illustrating the sixth exemplary embodiment of a driving operation assisting system 2. Like reference numerals are used to denote like blocks or portions throughout FIG. 14 and FIGS. 1 and 2. The sixth exemplary embodiment is substantially the same as the first exemplary embodiment represented by FIGS. 1 and 2 except the features described below.

Figure 15:
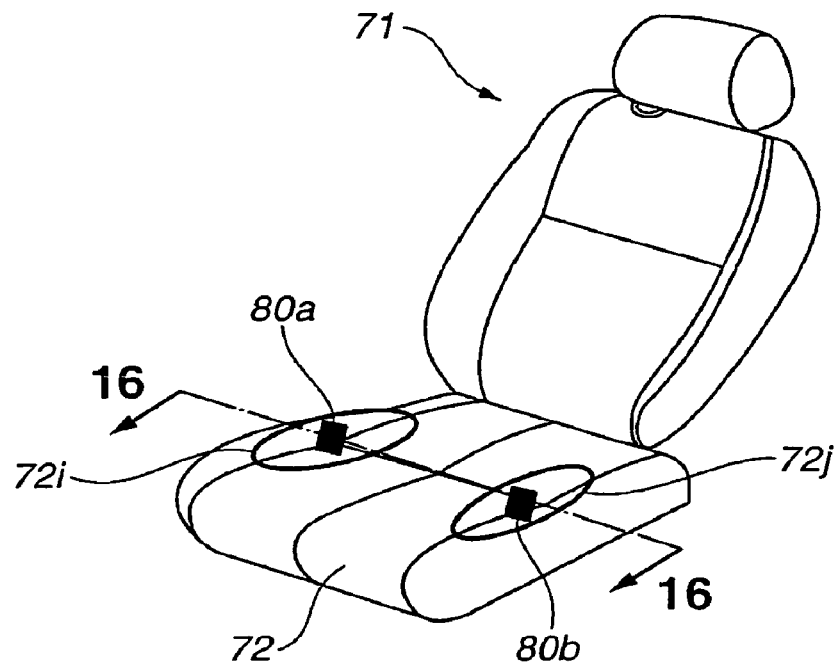
FIG. 15 is a seat incorporating a seat side vibrator.
Figure 16:
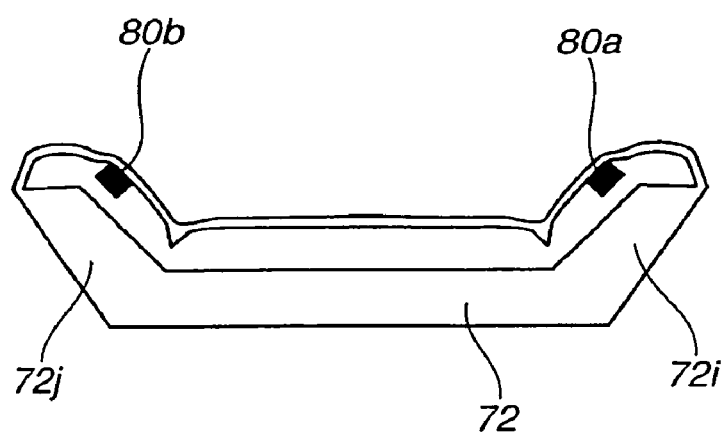
FIG. 16 is a cross section taken through the line 16-16 in FIG. 15.

The driving operation assisting system 2 is further provided with a seat side vibrator 80 provided to produce vibrations from right and left side portions of a cushion 72 of a seat 71. FIGS. 15 and 16 illustrate the seat side vibrator 80. FIG. 16 is a cross section taken through the line 16-16 in FIG. 15. The cushion 72 includes right and left side portions 72i and 72j. Vibrator elements 80a and 80b are embedded into the right and left side portions 72i and 72j, respectively. The vibrator elements 80a and 80b, when activated in response to control signal from a controller 50A, apply vibrations to an operator occupying the seat 71.

The controller 50A of the driving operation assisting system 2 is provided with a response delay estimation block 51, a risk potential calculation device 52, a seat side angle calculation device 53, and a vibration calculation device 54. The vibration calculation device 54 sets the amplitude of vibration based on a risk potential RP and a response delay index S.

Figure 17:
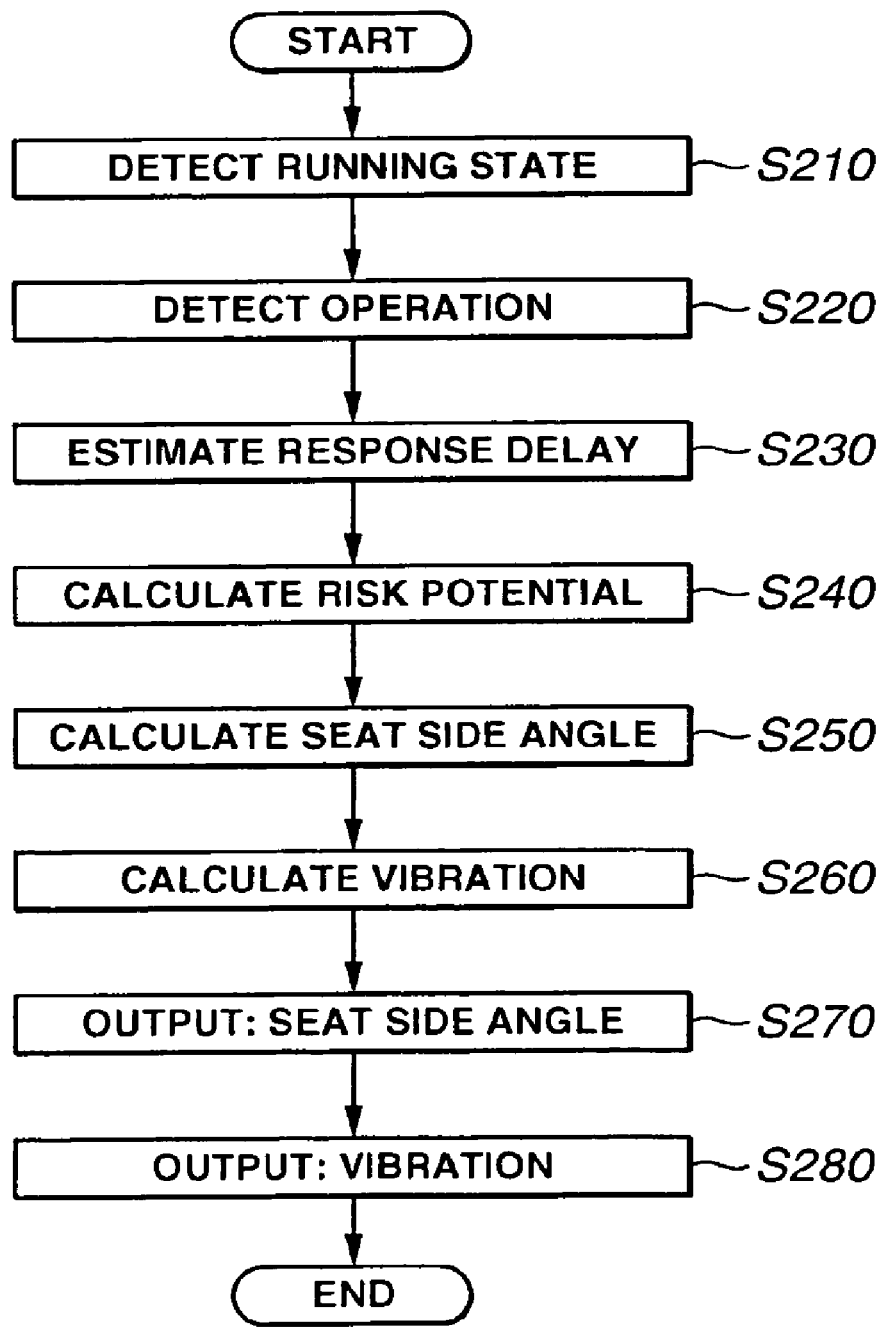
FIG. 17 is a flow chart of a main routine illustrating the operation of the exemplary embodiment shown in FIGS. 14 to 16.

Referring to FIG. 17, the operation of the sixth exemplary embodiment of the driving operation assisting system 2 is described. FIG. 17 is a flow chart illustrating steps of a driving operation assisting control program in the sixth exemplary embodiment. Execution of this program is repeated at regular intervals of 50 milliseconds. This control program includes steps S210 to S250 that exactly correspond to the steps S110 to S150 of the program illustrated by the flow chart in FIG. 6. Detailed description of these steps is hereby omitted.

In FIG. 17, at step S260, the controller 50A sets the amplitude of vibration to be produced by the cushion 72 based on the response delay index S calculated at step S230 and the risk potential RP calculated at step S240. If the risk potential RP is greater than 0 (zero) and the future position of the own vehicle indicates risk that the vehicle may deviate to the right from the lane, the controller 50A causes the right side portion 72i to produce vibration. If the risk potential RP is less than 0 (zero) and the future position of the own vehicle indicates risk that the vehicle may deviate to the left from the lane, the controller 50A causes the left side portion 72J to produce vibration. If the absolute value of the risk potential RP increases, the amplitude of vibration set by the controller 50A increases.

The frequency of vibration varies with different values of the response delay index S. If the response delay index S is short and the response delay by the operator is short, the frequency of vibration set by the controller 50A reduces. If the response delay index S is long and the response delay by the operator is long, the frequency of vibration set by the controller 50A increases.

At step S270, the controller 50A provides motor rotary angles for the swing angles θR and θL calculated at step S250 to the seat side actuator assembly 70. At step S280, the controller 50A provides control signals to the seat side vibrator 80 to cause production of vibration to be applied to the operator. After step S280, the main routine comes to an end.

In addition to the effects provided by the first exemplary embodiment, the sixth exemplary embodiment provides the following effect:

The controller 50A causes the cushion 72 to produce vibration in addition to production of pressing force from right and left side portions 73i and 73j of the seat back 73 in response to the risk potential RP. The controller 50A increases the amplitude of vibration as the magnitude of risk potential RP increases, and varies the frequency of vibration with different values of the response delay index S, thereby transmitting the risk potential RP to the operator with good accuracy.

In the description on the first to sixth exemplary embodiments, the risk potential RP at the future position of the own vehicle is transmitted to the operator by rotating right and left side portions 73i and 73j of the seat back 73. The present disclosure is not limited to this example. In addition to the right and left side portions 73i and 73j of the seat back 73, the right and left side portions 72i and 72j of the cushion 72 may also be rotated. Further, the right and left side portions 72i and 72j of the cushion 72 only may be rotated to transmit information to the operator. Furthermore, the right and left side portions 72i and 72j of the cushion 72 or the right and left side portions 73i and 73j of the seat back 73 may be selectively activated to transmit the risk potential RP to the operator.

The seat side actuator assembly 70 is not limited to the illustrated example in FIGS. 3 and 4. For example, the motor units 73f and 73g may be replaced with air bags to be embedded into the seat 71 to modify the surface contour of portions of the seat 71. If the air bags are used as the seat actuators, the internal pressure of each of the air bags is regulated to apply a pressing force to the operator in response to the risk potential RP. The mount sites of the vibrator elements 80a and 80b are not limited to the illustrated example. The vibrator elements 80a and 80b may be embedded into the seat back 73 at two portions or only one vibrator element may be embedded at a mid point of the seat back 73. The vibration may be produced by minutely activating the right and left side portions 73i and 73j.

The operation detector 40 may detects depression of the accelerator pedal by the operator and estimates a response delay based on the detected depression of the accelerator pedal.

In the first to sixth exemplary embodiments, the front camera 20 and vehicle speed sensor 30 perform the function of driving environment detecting means. The response delay estimation block 51 performs the function of response delay estimating means. The risk potential calculation device 52 performs the function of risk potential calculating means. The seat side actuator assembly 70 and seat side vibrator 80 perform the function of information transmitting means. The operation detector 40 performs the function of operation detecting means. The front camera 20 and controller 50 perform the function of road shape detecting means.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. A system for assisting an operator in operating an own vehicle, the system comprising:
   a detector configured to detect a driving environment around the own vehicle;
   a response delay estimating device configured to estimate a response delay by the operator;
   a risk potential calculating device configured to calculate risk potential associated with the own vehicle at a future position based on the detected driving environment and the estimated response delay;
   an information transmitting device configured to transmit the calculated risk potential to the operator via a haptic input; and
   an operation detecting device configured to detect an operation performed by the operator,
   wherein the response delay estimating device estimates the response delay based on the detected operation,
   wherein a standard deviation of the detected operation is calculated,
   wherein the estimated response delay is estimated based on the calculated standard deviation of the detected operation,
   wherein responsive to the calculated risk potential indicating a risk to deviate to the right at the calculated future position, the information transmitting device sets a swing angle of a right portion of a seat occupied by the operator based on the calculated risk potential, and sets a swing angle of a left portion of the seat to zero; and
   responsive to the calculated risk potential indicating a risk to deviate to the left at the calculated future position, the information transmitting device sets the swing angle of the left portion of the seat based on the calculated risk potential, and sets the swing angle of the right portion of the seat to zero.

2. The system of claim 1, wherein:
   the estimated response delay increases as the standard deviation increases; and
   the estimated response delay decreases as the standard deviation decreases.

3. A system for assisting an operator in operating an own vehicle, the system comprising:
   a detector configured to detect a driving environment around the own vehicle;
   a response delay estimating device configured to estimate a response delay by the operator;
   a risk potential calculating device configured to calculate risk potential associated with the own vehicle at a future position based on the detected driving environment and the estimated response delay; and
   an information transmitting device configured to transmit the calculated risk potential to the operator via a haptic input;
   wherein the future position is set to vary with the estimated response delay,
   wherein a standard deviation of an in-lane lateral position of the own vehicle within a lane is calculated,
   wherein the response delay is estimated based on the standard deviation of the in lane lateral position of the own vehicle within a lane,
   wherein responsive to the calculated risk potential indicating a risk to deviate to the right at the calculated future position, the information transmitting device sets a swing angle of a right portion of a seat occupied by the operator based on the calculated risk potential, and sets a swing angle of a left portion of the seat to zero; and
   responsive to the calculated risk potential indicating a risk to deviate to the left at the calculated future position, the information transmitting device sets the swing angle of the left portion of the seat based on the calculated risk potential, and sets the swing angle of the right portion of the seat to zero.

4. In a vehicle having a steering wheel of a steering system manipulated by an operator, a system comprising:
   a front camera mounted to the vehicle and configured to pick up an image of a road ahead of the vehicle;
   a vehicle speed sensor mounted to the vehicle configured to detect a vehicle speed of the vehicle;
   an operation detector attached to the steering system and configured to detect a steering angle of the steering wheel;

a driver's seat mounted to the vehicle and occupied by the operator, the driver's seat including a right side portion and a left side portion;

a seat side actuator assembly including a right side actuator configured to swing the right side portion toward the operator in response to a seat right side control signal indicative of a seat side swing angle for the right side portion, and a left side actuator configured to swing the left side portion toward the operator in response to a seat left side control signal indicative of a seat side swing angle for the left side portion; and a controller configured to:
  calculate a response delay index;
  calculate a lead time using the calculated response delay index;
  calculate a future position, which the vehicle will reach upon elapse of the calculated lead time based on the detected, based on the image picked up by the front camera, the vehicle speed detected by the vehicle speed sensor, the steering angle detected by the operation detector;
  calculate risk potential around the vehicle at the calculated future position;
  calculate the seat side swing angles for the right and left side portions, respectively; and
  generate the seat right side control signal and the seat left side control signal indicative of the seat side swing angles;

wherein responsive to the calculated risk potential indicating a risk to deviate to the right at the calculated future position, the right side actuator sets a swing angle of a right portion of a seat occupied by the operator based on the calculated risk potential, and the left side actuator sets a swing angle of a left portion of the seat to zero; and responsive to the calculated risk potential indicating a risk to deviate to the left at the calculated future position, the left side actuator sets the swing angle of the left portion of the seat based on the calculated risk potential, and the right side actuator sets the swing angle of the right portion of the seat to zero.

5. The combination as claimed in claim 4, wherein the controller repeats calculation of a steering angle rate based on the detected steering angle to give values of the steering angle rate versus time, collects the values of the steering angle rate over a predetermined period of time ending with the present moment, calculates as a standard deviation of the collected values of the steering angle rate over the predetermined period of time, and uses the calculated standard deviation in calculating the response delay index.

6. The combination as claimed in claim 5, wherein the response delay index is a product of a predetermined coefficient and the calculated standard deviation.

7. The combination as claimed in claim 4, wherein the controller calculates an in-lane lateral position of the vehicle within a lane based on the image picked up by the front camera to give values of the in-lane lateral position versus time, collects the values of the in-lane lateral position over a predetermined period of time ending with the present moment, calculates a standard deviation of the collected values of the in-lane lateral position over the predetermined period of time, and uses the calculated standard deviation in calculating the response delay index.

8. The combination as claimed in claim 7, wherein the response delay index is a product of a predetermined coefficient and the calculated standard deviation.

* * * * *